(12) United States Patent
Pineau

(10) Patent No.: US 10,927,265 B2
(45) Date of Patent: Feb. 23, 2021

(54) BLOCK COPOLYMER FOR PROTECTING PARTS MADE FROM METAL

(71) Applicants: ARKEMA FRANCE, Colombes (FR); COMPAGNIE GENERALE DES ETABLISSEMENTS MICHELIN, Clermont-Ferrand (FR)

(72) Inventor: Quentin Pineau, Evreux (FR)

(73) Assignees: ARKEMA FRANCE, Colombes (FR); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 560 days.

(21) Appl. No.: 15/513,723

(22) PCT Filed: Sep. 4, 2015

(86) PCT No.: PCT/FR2015/052350
§ 371 (c)(1),
(2) Date: Mar. 23, 2017

(87) PCT Pub. No.: WO2016/046463
PCT Pub. Date: Mar. 31, 2016

(65) Prior Publication Data
US 2019/0144687 A1   May 16, 2019

(30) Foreign Application Priority Data
Sep. 24, 2014   (FR) ..................... 1459013

(51) Int. Cl.
*C08G 81/02* (2006.01)
*C09D 187/00* (2006.01)
*C09D 5/08* (2006.01)

(52) U.S. Cl.
CPC ............. *C09D 5/08* (2013.01); *C08G 81/028* (2013.01); *C09D 187/005* (2013.01)

(58) Field of Classification Search
CPC ....... C08G 81/028; C08G 69/40; C08L 77/00; C08L 77/02; C08L 77/04; C08L 77/06;
(Continued)

(56) References Cited

U.S. PATENT DOCUMENTS 4,018,731 A * 4/1977 Sims ..................... C08G 69/02
                                                       525/184
4,298,707 A * 11/1981 Hergenrother ......... C08C 19/44
                                                       521/128
(Continued)

FOREIGN PATENT DOCUMENTS

EP         0425341 A1    5/1991
EP         0471566 A1    2/1992
(Continued)

OTHER PUBLICATIONS

P. Petrov et al: Polyamide-6-b-Polybutadiene Block Copolymers: Synthesis and Properties, Journal of Applied Polymer Science, vol. 89, No. 3, Jul. 18, 2003 (Jul. 18, 2003), pp. 711-717.
(Continued)

*Primary Examiner* — Lee E Sanderson
(74) *Attorney, Agent, or Firm* — Dickinson Wright PLLC

(57) ABSTRACT

The invention relates to the use of a block copolymer comprising
 at least one polyamide block and
 at least one polyolefin block
 to give to the metal-based material onto which it is applied adhesion and anti-corrosion properties.
Another subject of the invention is a block copolymer including
 at least one polyamide block
 at least one polyolefin block and
 at least one alkylene block,
Its preparation process, a composition containing it and a process for using said composition.

17 Claims, 1 Drawing Sheet

(58) Field of Classification Search
CPC .......... C08L 77/08; C08L 77/10; C08L 71/02;
C08J 2371/02
USPC ...... 525/94, 98, 436; 428/36.91, 36.9, 36.92
See application file for complete search history.

(56) References Cited

U.S. PATENT DOCUMENTS

| | | | |
|---|---|---|---|
| 5,138,021 A | 8/1992 | Judas et al. | |
| 5,455,309 A | 10/1995 | Albini et al. | |
| 5,663,234 A * | 9/1997 | Kennedy | C08G 81/028 525/123 |
| 5,665,855 A | 9/1997 | Acevedo et al. | |
| 6,602,565 B1 * | 8/2003 | Katayama | B05D 3/101 428/35.7 |
| 2012/0000541 A1 | 1/2012 | Dowe et al. | |
| 2013/0267664 A1 * | 10/2013 | Jeol | C08G 81/028 525/418 |

FOREIGN PATENT DOCUMENTS

| | | |
|---|---|---|
| EP | 0581641 A1 | 2/1994 |
| EP | 0739924 A1 | 10/1996 |
| FR | 2510121 A1 | 1/1983 |
| GB | 2262939 A | 7/1993 |
| WO | 9700293 A1 | 1/1997 |
| WO | 2012080404 A1 | 6/2012 |

OTHER PUBLICATIONS

ISO standard 1874-1:1992 "Plastics—Polyamide (PA) moulding and extrusion materials—Part 1: Designation", in particular on p. 3 (tables 1 and 2).
"Cycloaliphatic Amines" (Encyclopaedia of Chemical Technology, Kirk-Othmer, 4th Edition (1992), pp. 386-405).
International Search Report for PCT/FR2015/052350 dated Mar. 11, 2015.

* cited by examiner

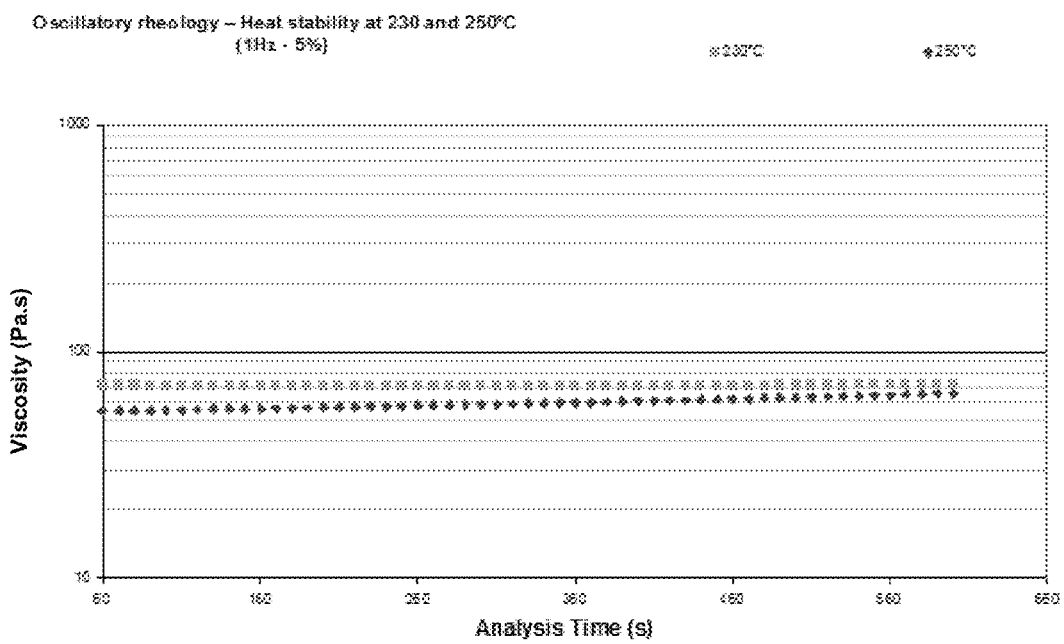

BLOCK COPOLYMER FOR PROTECTING PARTS MADE FROM METAL

This application is a 371 national phase entry of PCT/FR2015/052350, filed 4 Sep. 2015, which claims benefit of French Patent Application No. 1459013, filed 24 Sep. 2014, the entire contents of which are incorporated herein by reference for all purposes.

BACKGROUND

1. Technical Field

The invention relates to a use of a block copolymer comprising at least one polyamide block and at least one polyolefin block for the protection of metal-based components.

The invention also relates to a block copolymer comprising at least one polyamide block, at least one polyolefin block and at least one alkylene block, its preparation process, a composition containing it, and a process for using the composition.

The invention lastly relates to a component coated by the composition comprising the block copolymer according to the invention.

2. Related Art

In very varied fields, metal components or structures are exposed to external attacks over a very long period, whether this be metal components exposed to air, to the water surface or under water. For example, bridge suspension cables are exposed to wide temperature differences. Boat hulls or propellers are exposed to salt water for long periods at diverse temperatures. Pipes or pipelines used in the off-shore field are also exposed to long periods in salt water and to extreme pressures.

In these specific fields, the metal structures have a long lifetime and must have effective and long-lasting corrosion-resistance.

For a long time, means of improving corrosion-resistance have been targeted. Various approaches have been taken to solve this technical problem. Research has been conducted on the structure of the metal materials themselves. Anti-corrosion treatments that the material has undergone before being installed have also been developed, such as chromium or phosphate treatments. A final approach consists in applying a coating to the metal component.

In the field of coating metal components, progress remains to be made, because the target material must meet a number of criteria. It must adhere perfectly to the metal component: the adhesion must be strong and long-lasting.

The coating must then have effective and long-lasting corrosion-resistance.

Finally, depending on the application, the coating must be able to receive an extra coating. In this context, the target coating must be able to have high and long-lasting adhesion with a material other than a metal component.

SUMMARY

The Applicant has discovered that block copolymers having specific structures solve the technical problem laid out.

Said block copolymers are thermoplastic copolymers and are not rubbers. In other words, the block copolymer is not crosslinked and cannot therefore be a rubber.

It has been able to observe that these copolymers, which lead to this two-fold performance: good adhesion with metal components and good anti-corrosion properties, also have good adhesion capacity with other plastic components.

Therefore the present invention relates to a use of a block copolymer including
  at least one polyamide block and
  at least one polyolefin block
to give anti-corrosion and adhesion properties to a component comprising a comprising metal, of which said portion is coated by said copolymer.

Another subject of the invention is a block copolymer including
  at least one polyamide block
  at least one polyolefin block and
  at least one alkylene block.

The invention relates to a preparation process of such a block copolymer.

The invention also relates to a composition including such a block copolymer.

The invention relates to a process of using said composition.

The invention lastly relates to a component coated by the composition.

BRIEF DESCRIPTION OF THE DRAWINGS

The present invention will be understood better from reading the detailed description of embodiments considered by way of entirely non-limiting examples and illustrated by the appended FIG. 1 which is a graph showing the thermal stability of a copolymer according to an example embodiment.

DETAILED DESCRIPTION OF EXAMPLE EMBODIMENTS

Other features, aspects, subjects and benefits of the present invention will emerge even more clearly on reading the description and the examples that follow.

The expression "comprised between", as used in the rest of the present description, is specified to be understood as including each of the limits mentioned.

Use

The invention relates to the use of a block copolymer as defined above for the protection of a component made in whole or part of metal.

Preferably, the invention relates to this use to give the metal-based material, onto which it is applied, adhesion and anti-corrosion properties.

It has been observed unexpectedly that these block copolymers, having specific structure, have an affinity for metal surfaces or surfaces containing metal.

Copolymers that are useful according to the invention have excellent adhesion on this type of surface.

They also have the advantage of protecting the coated surfaces from corrosion and from all external attacks that these surfaces are subject to.

These copolymers are thermoplastic copolymers and are not rubbers.

In the sense of the present invention, metal-based material is understood to mean metal elements made in whole or part of metal or plastic or elastic materials including metal fibres.

Consequently, the use according to the invention aims to give anti-corrosion and adhesion properties to a component comprising metal, of which said portion is coated by said copolymer. It also targets giving the coated portion adhesion to plastic or elastic materials.

These elements may have very diverse forms: cables, ropes, a tube, a container, a film or a plate, preferably a tube, Block Copolymer The useful block copolymer according to the present invention includes:
- at least one polyamide block and
- at least one polyolefin block.

The structure of these blocks is described below.

Polyamide Block

The nomenclature used to define the polyamides is described in ISO standard 1874-1:1992 "Plastics—Polyamide (PA) moulding and extrusion materials—Part 1: Designation", in particular on page 3 (tables 1 and 2) and is well known to the person skilled in the art.

The polyamide block according to the present invention may have a homopolyamide or copolyamide structure.

In the sense of the present invention, homopolyamide is understood to mean a polyamide that is only constituted of the repetition of a single unit.

In the sense of the present invention copolyamide is understood to mean a polyamide that is constituted of the repetition of at least two units having different chemical structure. This copolyamide may have a random, alternate or block structure.

The polyamide block according to the present invention may comprise one or more units having structure chosen from amino acids, lactams and (diamine).(diacid) units.

When the polyamide includes an amino acid in its structure, it may be chosen from 9-aminononanoic acid (A=9), 10-aminodecanoic acid (A=10), 10-aminoundecanoic acid (A=11), 12-aminododecanoic acid (A=12) and 11-aminoundecanoic acid (A=11) and derivatives thereof, in particular N-heptyl-11-aminoundecanoic acid, where A denotes the number of carbon atoms in the unit.

When the polyamide includes a lactam, it may be chosen among pyrrolidinone, 2-piperidinone, caprolactam, enantholactam, caprylolactam, pelargolactam, decanolactam, undecanolactam, and lauryllactam (A=12).

When the polyamide includes is a unit having the formula (Ca diamine).(Cb diacid), Ca and Cb denoting the number of carbon atoms respectively in the diamine and the diacid, the unit (Ca diamine) is chosen from aliphatic, linear or branched diamines, cycloaliphatic diamines and alkylaromatic diamines.

When the diamine is aliphatic and linear, having formula $H_2N-(CH_2)_a-NH_2$, the monomer (Ca diamine) is preferably chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and diamines obtained from fatty acids.

When the diamine is aliphatic and branched, it may include one or more methyl or ethyl substituents on the main chain. For example, the monomer (Ca diamine) may advantageously be chosen from 2,2,4-trimethyl-1,6-hexanediamine, 2,4,4-trimethyl-1,6-hexanediamine, 1,3-diaminopentane, 2-methyl-1,5-pentanediamine, 2-methyl-1,8-octanediamine.

When the monomer (Ca diamine) is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclo-hexyl)propane, bis(3,5-dialkyl-4-aminocyclo-hexyl)butane, bis-(3-methyl-4-aminocyclohexyl)-methane (BMACM or MACM), p-bis(aminocyclohexyl)-methane (PACM) and isopropylidenedi(cyclohexylamine) (PACP), isophoronediamine (a=10), piperazine (a=4), amino-ethylpiperazine. It may also include the following carbon backbones: norbornyl methane, cyclohexylmethane, dicyclohexylpropane, di(methylcyclohexyl), di(methylcyclohexyl) propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the monomer (Ca diamine) is alkylaromatic, it is chosen from 1,3-xylylene diamine and 1,4-xylylene diamine.

The unit (Cb diacid) is chosen from aliphatic, linear or branched diacids, cycloaliphatic diacids and aromatic diacids.

When the monomer (Cb diacid) is aliphatic and linear, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecenedioic acid (b=18), eicosanedioic acid (b=20), docosanedioic acid (b=22) and fatty acid dimers containing 36 carbons.

The fatty acid dimers mentioned above are fatty acids obtained by oligomerization or polymerization of monobasic unsaturated fatty acids with long hydrocarbon-based chains (such as linoleic and oleic acid), as described in particular in document EP 0 471 566.

When the diacid is cycloaliphatic, it may include the following carbon backbones: norbornyl methane, cyclohexylmethane, dicyclohexylmethane, dicyclohexylpropane, di(methylcyclohexyl), di(methylcyclohexyl)propane.

When the diacid is aromatic, it is chosen from terephthalic acid (note T), isophthalic acid (note I) and naphthalene diacids. Preferably, the polyamide block in the block copolymer that is useful according to the invention is chosen from PA 6, PA 11, PA12, PA 6.10, PA 6.6, PA 6.12, PA 10.10, PA 10.12, PA 11/10.T, PA 11/6.T, 12/10.T, 6.10/10.T, 6.12/10.T, 10.10/10.T, 10.12/10.T, 11/6.T/10.T, 12.12/10.T, 12/6.10/10.T, 12/6.12/10.T, 12/10.10/10.T, 12/10.12/10.T and 12/12.12/10.T.

Preferably, the block polyamide has a number average molecular weight measured by potentiometry comprised between 600 and 20 000, preferably, between 4000 and 10 000 g/mol.

Preferably, the block copolymer according to the invention includes a polyamide block content comprised between 2 and 98%, preferably, between 30 and 95%, more preferably, between 50 and 94%, preferentially between 70 and 92% and most preferably between 75 and 90% by weight relative to the total weight of the block copolymer.

Chain Endings

The polyamide block or blocks end in amine, acid, isocyanate and anhydride functions.

Polyolefin Block

Polyolefin is understood to mean a homopolymer or copolymer comprising one or more olefin units such as ethylene, propylene, 1-butene, 1-octene, butadiene units, or any other alpha-olefin. As examples of polyolefin, mention may be made of polyethylene and in particular low-density polyethylene (LDPE), high-density polyethylene (HDPE), linear low-density polyethylene (LLDPE) and very low-density polyethylene (VLDPE); polypropylene; ethylene/ propylene copolymers; elastomer polyolefins such as ethylene-propylene elastomers (EPR or EPM) or ethylene-propylene-diene monomer (EPDM); or metallocenes polyethylenes obtained from monosite catalysis.

Advantageously, polyolefin is understood to mean a homopolymer or copolymer comprising one or more olefin units such as ethylene, propylene, 1-butene, 1-octene, butadiene units, or any other alpha-olefin, with the exclusion of isoprene, chlorinated or unchlorinated.

Preferably, the polyolefin block is a polybutadiene block.

It may include 1,4-cis, 1,4-trans or 1,2-sequences or a mixture thereof. Preferably, the polybutadiene includes mainly 1,2-sequences.

The block copolymer comprises a polyolefin block content comprised between 2 and 98%, preferably between 5 and 70, more preferably between 6 and 50%, preferentially between 8 and 30, and most preferably between 10 and 25% by weight relative to the total weight of the block copolymer (including limits).

Preferably, the balance is polyamide.

Chain Endings

The polypolyolefin block or blocks may end in functions chosen from amine, acid, alcohol, isocyanate and anhydride.

In a more preferred manner, the polypolyolefin block is a polybutadiene block that ends in alcohol functions.

The product with brand name Krasol® or Poly Bd® sold by Cray Valley may be used.

Advantageously, the polyolefin block is a polybutadiene block, ending in alcohol functions, with a content comprised between 2 and 98%, preferably between 5 and 70, more preferably between 6 and 50%, preferentially between 8 and 30, and most preferably between 10 and 25% by weight relative to the total weight of the block copolymer (including limits).

Preferably, the balance is polyamide.

Physical and Chemical Properties of the Polyolefin Block

The polyolefin block has viscosity less than 60 000 cps, preferably 40 000 cps, and preferably less than 20 000 cps and more preferably between 1000 and 20 000 cps, the viscosity being measured at 25° C. with a Brookfield viscometer and according to the Brookfield method.

Advantageously, the polyolefin block with number average molecular weight comprised between 1000 and 10 000, particularly between 1000 and 4000.

Intermediate Bonds Between the Blocks

The polyamide and polyolefin block or blocks may end in functions chosen from amine, acid, isocyanate, alcohol and anhydride functions. The polyolefin and polyamide block or blocks are modified so as to end with these functions.

Consequently, the bonds between the blocks may be ester, amide, urea and/or urethane functions.

Alkylene Block

The block copolymers that are useful according to the invention may include in their structure at least one alkylene block.

In the sense of the present invention alkylene block is understood to mean an aliphatic, linear, saturated chain.

Preferably, the alkylene block is a $C_2$-$C_{36}$ diacid, more preferably a $C_8$-$C_{36}$ diacid, most preferably a $C_{10}$-$C_{36}$ diacid.

The alkylene block or blocks may end in functions chosen from amine, acid, isocyanate, alcohol and anhydride functions.

In a more preferred manner, the block copolymer according to the invention includes an alkylene block that ends in acid functions.

In an even more preferred manner, the block copolymer according to the invention includes an alkylene block including between 8 and 36 carbon atoms, particularly $C_{10}$-$C_{36}$ carbon atoms. More particularly, the alkylene block is a fatty diacid.

More particularly, the alkylene block is a fatty acid dimer or a dimerized fatty acid.

Preferably, the block copolymer according to the invention is characterized by a specific arrangement: the alkylene block is between a polyamide block and a polyolefin block.

Consequently, the alkylene block plays the role of bond or linker between the polyamide and polyolefin polymer blocks.

The product with brand name Pripol® sold by Croda may be used.

The product with brand name Empol® sold by Cognis may be used.

The product with brand name Unydime® sold by Arizona Chemical may be used.

The product with brand name Radiacid® sold by Oleon may be used.

Preferably, the alkylene block is located between a polyamide block and a polyolefin block.

More particularly, the block copolymer according to the invention has the following formula:

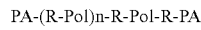

PA-(R-Pol)n-R-Pol-R-PA

With n comprised between 0 and 100, particularly from 0 to 10, preferably 0 or 1.

PA denotes the polyamide block,

R denotes the alkylene block,

Pol denotes the polyolefin block.

More particularly, the block copolymer according to the invention has the following formula:

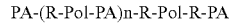

PA-(R-Pol-PA)n-R-Pol-R-PA

With n comprised between 0 and 100, particularly from 0 to 10, preferably 0 or 1.

PA, R and Pol are as defined above.

Preferably, the block copolymer according to the invention includes an alkylene block content comprised between 0.1 and 25%, preferably between 1 and 15% by weight relative to the total weight of the block copolymer.

Advantageously, the block copolymer according to the invention includes an alkylene block content comprised between 0.1 and 25%, a polyamide block content comprised between 2 and 98%, a polyolefin block content comprised between 2 and 98%, by weight compared with the total weight of the block copolymer, the sum being equal to 100%.

Advantageously, the block copolymer according to the invention includes an alkylene block content comprised between 0.1 and 25%, a polyamide block content comprised between 2 and 98%, a polyolefin block content comprised between 5 and 70%, by weight compared with the total weight of the block copolymer, the sum being equal to 100%.

Advantageously, the block copolymer according to the invention includes an alkylene block content comprised between 0.1 and 25%, a polyamide block content comprised between 2 and 98%, a polyolefin block content comprised between 6 and 50%, by weight compared with the total weight of the block copolymer, the sum being equal to 100%.

Advantageously, the block copolymer according to the invention includes an alkylene block content comprised between 0.1 and 25%, a polyamide block content comprised between 2 and 98%, a polyolefin block content comprised between 8 and 30%, by weight compared with the total weight of the block copolymer, the sum being equal to 100%.

Advantageously, the block copolymer according to the invention includes an alkylene block content comprised between 0.1 and 25%, a polyamide block content comprised between 2 and 98%, a polyolefin block content comprised between 10 and 25%, by weight compared with the total weight of the block copolymer, the sum being equal to 100%.

Advantageously, the block copolymer according to the invention includes an alkylene block content comprised between 0.1 and 25%, a polyamide block content comprised between 30 and 95%, a polyolefin block content comprised between 2 and 98%, by weight compared with the total weight of the block copolymer, the sum being equal to 100%.

Advantageously, the block copolymer according to the invention includes an alkylene block content comprised between 0.1 and 25%, a polyamide block content comprised between 30 and 95%, a polyolefin block content comprised between 5 and 70%, by weight compared with the total weight of the block copolymer, the sum being equal to 100%.

Advantageously, the block copolymer according to the invention includes an alkylene block content comprised between 0.1 and 25%, a polyamide block content comprised between 30 and 95%, a polyolefin block content comprised between 6 and 50%, by weight compared with the total weight of the block copolymer, the sum being equal to 100%.

Advantageously, the block copolymer according to the invention includes an alkylene block content comprised between 0.1 and 25%, a polyamide block content comprised between 30 and 95%, a polyolefin block content comprised between 8 and 30%, by weight compared with the total weight of the block copolymer, the sum being equal to 100%.

Advantageously, the block copolymer according to the invention includes an alkylene block content comprised between 0.1 and 25%, a polyamide block content comprised between 30 and 95%, a polyolefin block content comprised between 10 and 25%, by weight compared with the total weight of the block copolymer, the sum being equal to 100%.

Advantageously, the block copolymer according to the invention includes an alkylene block content comprised between 0.1 and 25%, a polyamide block content comprised between 50 and 94%, a polyolefin block content comprised between 2 and 98%, by weight compared with the total weight of the block copolymer, the sum being equal to 100%.

Advantageously, the block copolymer according to the invention includes an alkylene block content comprised between 0.1 and 25%, a polyamide block content comprised between 50 and 94%, a polyolefin block content comprised between 5 and 70%, by weight compared with the total weight of the block copolymer, the sum being equal to 100%.

Advantageously, the block copolymer according to the invention includes an alkylene block content comprised between 0.1 and 25%, a polyamide block content comprised between 50 and 94%, a polyolefin block content comprised between 6 and 50%, by weight compared with the total weight of the block copolymer, the sum being equal to 100%.

Advantageously, the block copolymer according to the invention includes an alkylene block content comprised between 0.1 and 25%, a polyamide block content comprised between 50 and 94%, a polyolefin block content comprised between 8 and 30%, by weight compared with the total weight of the block copolymer, the sum being equal to 100%.

Advantageously, the block copolymer according to the invention includes an alkylene block content comprised between 0.1 and 25%, a polyamide block content comprised between 50 and 94%, a polyolefin block content comprised between 10 and 25%, by weight compared with the total weight of the block copolymer, the sum being equal to 100%.

Advantageously, the block copolymer according to the invention includes an alkylene block content comprised between 0.1 and 25%, a polyamide block content comprised between 70 and 92%, a polyolefin block content comprised between 2 and 98%, by weight compared with the total weight of the block copolymer, the sum being equal to 100%.

Advantageously, the block copolymer according to the invention includes an alkylene block content comprised between 0.1 and 25%, a polyamide block content comprised between 70 and 92%, a polyolefin block content comprised between 5 and 70%, by weight compared with the total weight of the block copolymer, the sum being equal to 100%.

Advantageously, the block copolymer according to the invention includes an alkylene block content comprised between 0.1 and 25%, a polyamide block content comprised between 70 and 92%, a polyolefin block content comprised between 6 and 50%, by weight compared with the total weight of the block copolymer, the sum being equal to 100%.

Advantageously, the block copolymer according to the invention includes an alkylene block content comprised between 0.1 and 25%, a polyamide block content comprised between 70 and 92%, a polyolefin block content comprised between 8 and 30%, by weight compared with the total weight of the block copolymer, the sum being equal to 100%.

Advantageously, the block copolymer according to the invention includes an alkylene block content comprised between 0.1 and 25%, a polyamide block content comprised between 70 and 92%, a polyolefin block content comprised between 10 and 25%, by weight compared with the total weight of the block copolymer, the sum being equal to 100%.

Advantageously, the block copolymer according to the invention includes an alkylene block content comprised between 0.1 and 25%, a polyamide block content comprised between 75 and 90%, a polyolefin block content comprised between 2 and 98%, by weight compared with the total weight of the block copolymer, the sum being equal to 100%.

Advantageously, the block copolymer according to the invention includes an alkylene block content comprised between 0.1 and 25%, a polyamide block content comprised between 75 and 90%, a polyolefin block content comprised between 5 and 70%, by weight compared with the total weight of the block copolymer, the sum being equal to 100%.

Advantageously, the block copolymer according to the invention includes an alkylene block content comprised between 0.1 and 25%, a polyamide block content comprised between 75 and 90%, a polyolefin block content comprised between 6 and 50%, by weight compared with the total weight of the block copolymer, the sum being equal to 100%.

Advantageously, the block copolymer according to the invention includes an alkylene block content comprised between 0.1 and 25%, a polyamide block content comprised between 75 and 90%, a polyolefin block content comprised between 8 and 30%, by weight compared with the total weight of the block copolymer, the sum being equal to 100%.

Advantageously, the block copolymer according to the invention includes an alkylene block content comprised between 0.1 and 25%, a polyamide block content comprised between 75 and 90%, a polyolefin block content comprised between 10 and 25%, by weight compared with the total weight of the block copolymer, the sum being equal to 100%.

Advantageously, the block copolymer according to the invention includes an alkylene block content comprised between 1 and 15%, a polyamide block content comprised between 2 and 98%, a polyolefin block content comprised between 2 and 98%, by weight compared with the total weight of the block copolymer, the sum being equal to 100%.

Advantageously, the block copolymer according to the invention includes an alkylene block content comprised between 1 and 15%, a polyamide block content comprised between 2 and 98%, a polyolefin block content comprised between 5 and 70%, by weight compared with the total weight of the block copolymer, the sum being equal to 100%.

Advantageously, the block copolymer according to the invention includes an alkylene block content comprised between 1 and 15%, a polyamide block content comprised between 2 and 98%, a polyolefin block content comprised between 6 and 50%, by weight compared with the total weight of the block copolymer, the sum being equal to 100%.

Advantageously, the block copolymer according to the invention includes an alkylene block content comprised between 1 and 15%, a polyamide block content comprised between 2 and 98%, a polyolefin block content comprised between 8 and 30%, by weight compared with the total weight of the block copolymer, the sum being equal to 100%.

Advantageously, the block copolymer according to the invention includes an alkylene block content comprised between 1 and 15%, a polyamide block content comprised between 2 and 98%, a polyolefin block content comprised between 10 and 25%, by weight compared with the total weight of the block copolymer, the sum being equal to 100%.

Advantageously, the block copolymer according to the invention includes an alkylene block content comprised between 1 and 15%, a polyamide block content comprised between 30 and 95%, a polyolefin block content comprised between 2 and 98%, by weight compared with the total weight of the block copolymer, the sum being equal to 100%.

Advantageously, the block copolymer according to the invention includes an alkylene block content comprised between 1 and 15%, a polyamide block content comprised between 30 and 95%, a polyolefin block content comprised between 5 and 70%, by weight compared with the total weight of the block copolymer, the sum being equal to 100%.

Advantageously, the block copolymer according to the invention includes an alkylene block content comprised between 1 and 15%, a polyamide block content comprised between 30 and 95%, a polyolefin block content comprised between 6 and 50%, by weight compared with the total weight of the block copolymer, the sum being equal to 100%.

Advantageously, the block copolymer according to the invention includes an alkylene block content comprised between 1 and 15%, a polyamide block content comprised between 30 and 95%, a polyolefin block content comprised between 8 and 30%, by weight compared with the total weight of the block copolymer, the sum being equal to 100%.

Advantageously, the block copolymer according to the invention includes an alkylene block content comprised between 1 and 15%, a polyamide block content comprised between 30 and 95%, a polyolefin block content comprised between 10 and 25%, by weight compared with the total weight of the block copolymer, the sum being equal to 100%.

Advantageously, the block copolymer according to the invention includes an alkylene block content comprised between 1 and 15%, a polyamide block content comprised between 50 and 94%, a polyolefin block content comprised between 2 and 98%, by weight compared with the total weight of the block copolymer, the sum being equal to 100%.

Advantageously, the block copolymer according to the invention includes an alkylene block content comprised between 1 and 15%, a polyamide block content comprised between 50 and 94%, a polyolefin block content comprised between 5 and 70%, by weight compared with the total weight of the block copolymer, the sum being equal to 100%.

Advantageously, the block copolymer according to the invention includes an alkylene block content comprised between 1 and 15%, a polyamide block content comprised between 50 and 94%, a polyolefin block content comprised between 6 and 50%, by weight compared with the total weight of the block copolymer, the sum being equal to 100%.

Advantageously, the block copolymer according to the invention includes an alkylene block content comprised between 1 and 15%, a polyamide block content comprised between 50 and 94%, a polyolefin block content comprised between 8 and 30%, by weight compared with the total weight of the block copolymer, the sum being equal to 100%.

Advantageously, the block copolymer according to the invention includes an alkylene block content comprised between 1 and 15%, a polyamide block content comprised between 50 and 94%, a polyolefin block content comprised between 10 and 25%, by weight compared with the total weight of the block copolymer, the sum being equal to 100%.

Advantageously, the block copolymer according to the invention includes an alkylene block content comprised between 1 and 15%, a polyamide block content comprised between 70 and 92%, a polyolefin block content comprised between 2 and 98%, by weight compared with the total weight of the block copolymer, the sum being equal to 100%.

Advantageously, the block copolymer according to the invention includes an alkylene block content comprised between 1 and 15%, a polyamide block content comprised between 70 and 92%, a polyolefin block content comprised between 5 and 70%, by weight compared with the total weight of the block copolymer, the sum being equal to 100%.

Advantageously, the block copolymer according to the invention includes an alkylene block content comprised between 1 and 15%, a polyamide block content comprised between 70 and 92%, a polyolefin block content comprised between 6 and 50%, by weight compared with the total weight of the block copolymer, the sum being equal to 100%.

Advantageously, the block copolymer according to the invention includes an alkylene block content comprised between 1 and 15%, a polyamide block content comprised between 70 and 92%, a polyolefin block content comprised between 8 and 30%, by weight compared with the total weight of the block copolymer, the sum being equal to 100%.

Advantageously, the block copolymer according to the invention includes an alkylene block content comprised between 1 and 15%, a polyamide block content comprised between 70 and 92%, a polyolefin block content comprised between 10 and 25%, by weight compared with the total weight of the block copolymer, the sum being equal to 100%.

Advantageously, the block copolymer according to the invention includes an alkylene block content comprised between 1 and 15%, a polyamide block content comprised between 75 and 90%, a polyolefin block content comprised between 2 and 98%, by weight compared with the total weight of the block copolymer, the sum being equal to 100%.

Advantageously, the block copolymer according to the invention includes an alkylene block content comprised between 1 and 15%, a polyamide block content comprised between 75 and 90%, a polyolefin block content comprised between 5 and 70%, by weight compared with the total weight of the block copolymer, the sum being equal to 100%.

Advantageously, the block copolymer according to the invention includes an alkylene block content comprised between 1 and 15%, a polyamide block content comprised between 75 and 90%, a polyolefin block content comprised between 6 and 50%, by weight compared with the total weight of the block copolymer, the sum being equal to 100%.

Advantageously, the block copolymer according to the invention includes an alkylene block content comprised between 1 and 15%, a polyamide block content comprised between 75 and 90%, a polyolefin block content comprised between 8 and 30%, by weight compared with the total weight of the block copolymer, the sum being equal to 100%.

Advantageously, the block copolymer according to the invention includes an alkylene block content comprised between 1 and 15%, a polyamide block content comprised between 75 and 90%, a polyolefin block content comprised between 10 and 25%, by weight compared with the total weight of the block copolymer, the sum being equal to 100%.

Advantageously, in the block copolymer according to the invention comprising a polyamide block, a polyolefin block and an alkylene block as defined above, the polyolefin block is polybutadiene.

Advantageously, in the block copolymer according to the invention comprising a polyamide block, a polyolefin block and an alkylene block as defined above, the polyolefin block is polybutadiene that ends in alcohol functions.

Advantageously, in the block copolymer according to the invention comprising a polyamide block, a polyolefin block and an alkylene block as defined above, the polyolefin block is a polybutadiene and the alkylene block is a $C_8$-$C_{36}$ diacid, particularly a $C_{10}$-$C_{36}$ diacid.

Advantageously, in the block copolymer according to the invention comprising a polyamide block, a polyolefin block and an alkylene block as defined above, the polyolefin block is a polybutadiene and the alkylene block is a fatty diacid.

Advantageously, in the block copolymer according to the invention comprising a polyamide block, a polyolefin block and an alkylene block as defined above, the polyolefin block is a polybutadiene and the alkylene block is a fatty diacid dimer.

Advantageously, in the block copolymer according to the invention comprising a polyamide block, a polyolefin block and an alkylene block as defined above, the polyolefin block is a polybutadiene that ends in alcohol functions and the alkylene block is a $C_8$-$C_{36}$ diacid, particularly a $C_{10}$-$C_{36}$ diacid.

Advantageously, in the block copolymer according to the invention comprising a polyamide block, a polyolefin block and an alkylene block as defined above, the polyolefin block is a polybutadiene that ends in alcohol functions and the alkylene block is a fatty diacid.

Advantageously, in the block copolymer according to the invention comprising a polyamide block, a polyolefin block and an alkylene block as defined above, the polyolefin block is a polybutadiene that ends in alcohol functions and the alkylene block is a fatty acid dimer.

Chain Lengthening Block

The block copolymer according to the invention may optionally comprise at least one chain lengthening block.

This chain lengthening block has structure:

Y1-A'-Y1 where A' is a hydrocarbon-based biradical having a non-polymeric structure (not a polymer, oligomer, or a prepolymer), bearing 2 identical terminal reactive functions Y1, reactive by polyaddition (without elimination of reaction by-product), with at least one function at the end of the block copolymer chain according to the invention, preferably with number average molecular weight of less than 500 and more preferably less than 400, particularly Y1 is chosen from: oxazine, oxazoline, oxazolinone, oxazinone, imidazoline, epoxy, isocyanate, maleimide, cyclic anhydride.

As suitable examples of chain lengthening blocks, the following can be cited:

when the chain endings $NH_2$ or OH functions, preferably $NH_2$, the chain lengthener Y1-A'-Y1 corresponds to:

Y1 chosen from the groups: maleimide, isocyanate, optionally blocked, oxazinone and oxazolinone, cyclic anhydride, preferably oxazinone and oxazolinone and A' is a carbon spacer or carbon-containing substituent bearing the reagent Y1 functions or groups, chosen from:

a covalent bond between two functions (groups) Y when Y1=oxazinone and oxazolinone or a hydrocarbon-based aliphatic chain or an aromatic and/or cycloaliphatic hydrocarbon-based chain, the last two of which comprise at least one 5- or 6-membered optionally substituted carbon atoms, with optionally said aliphatic hydrocarbon-based chain having a number average molecular weight of 14 to 200 g.mol$^{-1}$, The chain lengthener Y1-A'-Y1 may also correspond to a structure in which
Y1 is a caprolactam group and
A' is a carbonyl substituent such as carbonyl biscaprolactam or to A' being able to be terephthaloyl or an isophthaloyl substituent, The chain lengthener Y1-A'-Y1 may also bear a cyclic anhydride Y1 group and preferably this lengthener is chosen from a cycloaliphatic and/or aromatic carboxylic dianhydride and more preferably it is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3',4,4'-tetracarboxylic benzophenone dianhydride, 1,2,3,4-cyclobutanetetracarboxylic dianhydride, bisphthalic hexafluoroisopropylidene dianhydride, 9,9-bis(trifluoromethyl) xanthenetetracarboxylic dianhydride, 3,3',4,4'-diphenylsulphonetetracarboxylic dianhydride, bicyclo [2.2.2]oct-7-ene-2,3,5,6-tetracarboxylic dianhydride, 1,2,3,4-cyclopentanetetracarboxylic dianhydride, 3,3',4,4'-diphenyl ether tetracarboxylic dianhydride or mixtures thereof
and
when the chain endings are COOH functions:
said chain lengthener Y1-A'-Y1 corresponds to:
Y1 chosen from the groups: oxazoline, oxazine, imidazoline, aziridine, such as 1,1'-iso- or terephthaloyl-bis(2-methylaziridine) or epoxy,
A' being a carbon spacer (substituent) as defined above.

More specifically, when in said chain lengthener Y1-A'-Y1, said function Y1 is chosen from oxazinone, oxazolinone, oxazine, oxazoline or imidazoline, particularly oxazoline, in this case, in the chain lengthener represented by Y1-A'-Y1, A' may represent an alkylene such as —(CH2)m— where m ranges from 1 to 14 and preferably from 2 to 10 or A' may represent a substituted or unsubstituted cycloalkylene and/or arylene (alkyl), such as benzene arylenes, such as o-, m-, p- phenylenes or naphthalene arylenes and preferably A' is an arylene and/or a cycloalkylene.

When Y1 is an epoxy, the chain lengthener may be chosen from bisphenol A diglycidyl ether (DGEBA), and its hydrogen derivative (cycloaliphatic) bisphenol F diglycidyl ether, tetrabromo bisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether with Mn<500, polypropylene glycol diglycidyl ether with Mn<500, polytetramethylene glycol diglycidyl ether with Mn<500, resorcinol diglycidyl ether, neopentylglycol diglycidyl ether, bisphenol A polyethylene glycol diglycidyl ether with Mn<500, bisphenol A polypropyleneglycol diglycidyl ether with Mn<500, dicarboxylic acid diglycidyl esters such as the glycidyl ester of terephthalic acid or epoxidized diolefins (dienes) or fatty acids with epoxidized double ethylene unsaturation, diglycidyl 1,2-cyclohexanedicarboxylate, and mixtures thereof.

In the case of carbonyl- or terephthaloyl- or isophthaloyl-biscaprolactam as chain lengthener Y1-A'-Y1, the preferred conditions avoid by-products such as said caprolactam being eliminated during said polymerization and when used when melted.

In the optional case cited above where Y1 represents a blocked isocyanate function, this blocking may be obtained by blocking agents for the isocyanate function, such as epsilon-caprolactam, the methyl ethyl ketoxime, dimethyl pyrazole, diethyl malonate.

Similarly, in the case where the lengthener is a dianhydride reacting with NH2 functions from the block copolymer, the preferred conditions avoid any imide ring formation during polymerization and when used when melted.

For OH or NH2 block copolymer endings, the group Y1 is preferably chosen from: isocyanate (not blocked), oxazinone and oxazolinone, more preferably oxazinone and oxazolinone, with as spacer (substituent) A' being as defined above.

As examples of chain lengtheners bearing suitable reactive oxazoline or oxazine functions Y for using the invention, referral may be made to those described in references "A", "B", "C" and "D" on page 7 of application EP 0 581 642, and to their preparation processes and methods of reaction described there. "A" in this document is bisoxazoline, "B" is bisoxazine, "C" is 1,3-phenylene bisoxazoline and "D" is 1,4-phenylene bisoxazoline.

As an example, in the case where the CO2H endings of the block copolymer and the chain lengthener Y1-A'-Y1 are 1,4-phenylene bisoxazoline, the reaction product obtained has at least one recurrent unit having the following structure:

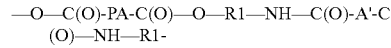

in which:
PA is a polyamide with acid endings HO—C(O)-PA-C(O)—OH as defined above,
R1 (CH2)2, and
A' is a phenyl.

As examples of chain lengtheners with reactive imidazoline functions Y1 for using the invention, referral may be made to those described in references "A" to "F" on page 7 to 8 and Table 1 of page 10 in application EP 0 739 924 and to their preparation processes and methods of reaction described there.

As examples of chain lengtheners with reactive oxazinone or oxazolinone functions Y1 suitable for using the invention, referral may be made to those described in references "A" to "D" on page 7 to 8 and in application EP 0 581 641 and to their preparation processes and methods of reaction described there.

As examples of suitable oxazinone substituents Y1 (6-membered ring) and oxazolinones (5-membered ring), Y1 substituents that are derivatives of benzoxazinone, oxazinone or oxazolinone can be cited, where spacer A' may be a single covalent bond with corresponding lengtheners being bis-(benzoxazinone), bisoxazinone and bisoxazolinone respectively.

A' may also be a C1 to C14 alkylene, preferably a C2 to C10 alkylene but preferably A' is an arylene and more preferably it may be a phenylene (substituted by Y1 in the 1,2- or 1,3- or 1,4-positions) or a naphthalene substituent (disubstituted by Y1) or a phthaloyl (iso- or terephthaloyl) or A' may be a cycloalkylene.

For Y1 functions such as oxazine (6-membered ring), oxazoline (5-membered ring) and imidazoline (5-membered ring), the A' substituent may be as described above where A' may be a simple covalent bond and where the corresponding lengtheners are bisoxazine, bisoxazoline and bisimidazoline respectively. A' may also be a C1 to C14 alkylene, preferably a C2 to C10 alkylene. The A' substituent is preferably an arylene and more preferably, it may be a phenylene (substituted by Y1 in the 1,2- or 1,3- or 1,4-positions) or a naphthalene substituent (disubstituted by Y1) or a phthaloyl (iso- or terephthaloyl) or A' may be a cycloalkylene.

When Y1=aziridine (3-membered nitrogen heterocycle equivalent to ethylene oxide with the ether —O— replaced with —NH—), the A' substituent may be a phthaloyl (1,1'-iso- or terephthaloyl) with as example of lengthener of this type, 1,1'-isophthaloyl-bis(2-methylaziridine).

The presence of a catalyst for the reaction between the block copolymer and said lengthener Y1-A'-Y1 at a level ranging from 0.001 to 2%, preferably from 0.01 to 0.5% relative to the total weight of two co-reactants cited may accelerate the (poly)addition reaction and thereby shorten the production cycle. Such a catalyst may be chosen from: 4,4' dimethyl aminopyridine, p-toluene sulphonic acid, phosphoric acid, NaOH and optionally those described for a polycondensation or transesterification as described in EP 0 425 341, page 9, lines 1 to 7.

According to a more specific case of choice of said lengthener, A' may represent an alkylene, such as —(CH$_2$) m- where m ranges from 1 to 14 and preferably from 2 to 10 or represents an unsubstituted arylene or an alkyl-substituted arylene, such as benzene-substituted arylenes (such as o-, m-, p- phenylenes) or naphthalenes (with arylenes: naphthalenylenes). Preferably, A' represents an arylene, which may be substituted or unsubstituted benzene or naphthene.

As already stated, said chain length (a2) has a non-polymeric structure and preferably a number average molecular weight less than 500, preferably less than 400.

Preferably, the block copolymer according to the invention includes at least one block chain lengthener located at one or more polyamide copolymer ends.

The level of said lengthener in said block copolymer varies from 1 to 20%, particularly from 5 to 20% by weight.

Advantageously, the block copolymer according to the invention comprising (or constituted of) a polyamide block and a polyolefin block, has a polyamide block content comprised between 2 and 98% by weight compared with the total weight of the block copolymer, a polyolefin block content comprised between 2 and 98% by weight compared with the total weight of the block copolymer and a level of said lengthener from 1 to 20% compared with the total weight of the block copolymer, the total being equal to 100%.

Advantageously, in this last block copolymer according to the invention, said lengthener is isocyanate (not blocked), oxazinone and oxazolinone, more preferably oxazinone and oxazolinone, with as spacer (substituent) A' being as defined as above.

Advantageously, the block copolymer according to the invention comprising (or constituted of) a polyamide block and a polyolefin block, has a polyamide block content comprised between 2 and 98% by weight compared with the total weight of the block copolymer, a polyolefin block content comprised between 2 and 98% by weight compared with the total weight of the block copolymer and a level of said lengthener from 5 to 20% compared with the total weight of the block copolymer, the total being equal to 100%.

Advantageously, in this last block copolymer according to the invention, said lengthener is isocyanate (not blocked), oxazinone and oxazolinone, more preferably oxazinone and oxazolinone, with as spacer (substituent) A' being as defined as above.

Advantageously, in the block copolymer according to the invention comprising (or constituted of) a polyamide block, an alkylene block and a polyolefin block as defined above, the level of said lengthener from 1 to 20% relative to the total weight of the block copolymer, the total being equal to 100%.

Advantageously, in this last block copolymer according to the invention, said lengthener is isocyanate (not blocked), oxazinone and oxazolinone, more preferably oxazinone and oxazolinone, with as spacer (substituent) A' being as defined as above.

Advantageously, in the block copolymer according to the invention comprising (or constituted of) a polyamide block, an alkylene block and a polyolefin block as defined above, the level of said lengthener from 5 to 20% relative to the total weight of the block copolymer, the total being equal to 100%.

Advantageously, in this last block copolymer according to the invention, said lengthener is isocyanate (not blocked), oxazinone and oxazolinone, more preferably oxazinone and oxazolinone, with as spacer (substituent) A' being as defined as above.

Block Copolymer

The block copolymer according to the invention includes:
at least one polyamide block, as defined above,
at least one polyolefin block, as defined above, and
at least one alkylene block, as defined above.

Proportions of the Blocks

Preferably, the block copolymer according to the invention includes
a block polyamide content comprised between 2 and 98% by weight relative to the total weight of the block copolymer,
a block polyolefin content comprised between 2 and 98% by weight relative to the total weight of the block copolymer, Preferably, the block copolymer according to the invention includes:
a block polyamide content comprised between 2 and 98% by weight relative to the total weight of the block copolymer,
a block polyolefin content comprised between 2 and 98% by weight relative to the total weight of the block copolymer,
an alkylene block content comprised between 0.1 and 25%, preferably between 1 and 15% by weight relative to the total weight of the block copolymer.

However, all the combinations of block copolymers comprising a polyamide block, a polyolefin block and an alkylene block or comprising a polyamide block, a polyolefin block, an alkylene block and a chain lengthener, defined above in the "Use" section are also according to the invention for this "Block copolymer" section.

The block copolymer according to the invention is a thermoplastic copolymer and is not a rubber.

Preparation Process for the Block Copolymer

The invention also relates to a preparation process for the block copolymer according to the invention.

The preparation process for the copolymer according to the invention comprises a step of mixing the different blocks.

Preferably, the process comprises the following successive steps:
a step of mixing polyolefin and alkylene blocks, the molar ratio between the polyolefin blocks and the alkylene blocks being greater than or equal to ½, then
a step of mixing polyamide blocks with the mixture obtained in the preceding step.

The preparation process may comprise an extra step of mixing chain lengthener blocks as defined above with the mixture obtained in the preceding step.

Composition

The invention also relates to a composition including the block copolymer according to the invention.

Preferably, the composition is found in the form of powder or granules.

The Additives

The composition according to the invention may also further comprise at least one additive.

This additive may in particular be chosen from processing aids, fillers, heat stabilizers, such as organic phosphite-based heat stabilizers, copper-based heat stabilizers, colorants, mould-release agents, fireproofing agents, surfactants, optical brighteners, antioxidants such as those based on phenol or the product sold under the name Naugard 445® sold by CHEMTURA, anti-UV such as HALS and mixtures thereof. Preferably, colorants are present in a proportion of 0 to 1.5%, in particular from 0.5 to 1% by weight relative to the total weight of the composition. Preferably, heat stabilizers are present in a proportion of 0 to 2%, in particular from 0.5 to 1% by weight relative to the total weight of the composition and the antioxidants are present in a proportion of 0 to 2%, in particular from 0.5 to 1% by weight relative to the total weight of the composition.

The composition may also comprise catalysts, such as phosphoric acid, hypophosphoric acid ($H_3PO_2$, $H_3PO_3$ and $H_3PO_4$).

Among adjuvants that are processing aids, mention may be made of stearates, such as calcium or zinc stearates, natural waxes, polymers comprising tetrafluoroethylene (TFE).

The weight proportion in processing aids is classically comprised between 0.01 and 0.3% by weight, advantageously between 0.02 and 0.1% by weight, relative to total weight of the composition.

Among fillers, mention may be made of silica, graphite, expanded graphite, carbon black, glass beads, kaolin, magnesium hydroxide, scoria, talc, nanofillers (carbon nanotubes), pigments, metal oxides (titanium oxide), metals, fibres (aramides, glass fibres, carbon fibres).

Depending on the nature of the fillers, their quantity may represent up to 30% by weight relative to total weight of the composition.

The Extra Polymers

A composition that complies with the invention may further comprise one or more extra polymers, such a polymer being distinct from the block copolymer or copolymers mentioned above.

Advantageously, this extra polymer may in particular be chosen from a block copolymer other than that defined previously, a polyamide, a block-polyamide-ether, a polyetheramide, a polyesteramide, a phenylene polysulphide (PPS), a polyphenylene oxide (PPO), a fluorinated polymer, a natural rubber, a synthetic rubber and mixtures thereof.

The extra polymer may also be chosen from starches, which may be modified and/or formulated, cellulose or its derivatives such as cellulose acetate or cellulose ethers, poly-lactic acid, poly-glycolic acid and polyhydroxyalkanoates.

Preferably, the extra polymer is chosen from aliphatic polyamides and block-polyamide-ethers. Among aliphatic polyamides, mention may in particular be made of long-chain polyamides such as PA11, PA12, PA6.10, PA6.12, PA6.14, PA10.10, PA10.12 and PA12.12.

The composition may thereby contain up to 20% by weight, relative to the total weight of the composition, of at least one extra polymer.

Process for Preparing the Composition

The invention also relates to the preparation process for the composition according to the invention.

This process comprises a step incorporating optional extra additives and polymers within the block copolymer's matrix.

Process for Using the Composition or Block Copolymer

The invention also relates to a process for using the composition according to the invention. This process comprises a step of injecting, extruding or spraying the composition.

Coated Component

The invention lastly relates to the component, comprising at least one portion comprising metal and a composition as defined above, said composition being applied to said portion.

In other words, the metal-based component is coated or covered by the composition according to the invention.

It is possible that the component be completely metallic, or only partially metallic. The coated zone must include metal to be protected from corrosion.

According to another embodiment of the invention, the component may comprise a second portion, different from the first, the composition being interspersed and in contact with the two portions.

Accordingly, this component may correspond to a multi-layer structure, in which the composition according to the invention would constitute an intermediate layer in direct contact with the component.

For example, the component according to the invention may be a metallic tube coated with a composition according to the invention, then covered by a second layer made of PA11.

The coated components described above may be in the form of a cable, a rope, a tube, a container, a film or a plate, preferably a tube.

The component according to the invention may be used to transport or store fluids, particularly fluids present in land, naval surface or underwater vehicles, in underwater (offshore) or on-shore platforms, for refrigeration systems such as stationary or mobile climate control, such as industrial or other refrigerators, for stationary or mobile air conditioning systems.

Specifically, the fluid is chosen from an oil, a brake liquid, urea solutions, glycol-based cooling liquids, fuels, and specifically biofuels, and even more specifically biodiesels, potable water, waste water, gas, air, heat transfer fluids, oil and its derivatives.

FIG. 1 shows the thermal stability at 230° C. (squares) and 250° C. (diamonds) for example 1 determined by oscillatory rheology.

X-axis: analysis time (s).

Y-axis: Viscosity (Pa.$)

The following examples serve to illustrate the invention without, however, being limiting in nature.

EXAMPLES

1/Synthesis of a Copolymer According to the Invention

Example:

The mixture of polybutadiene and fatty acid dimer in a molar ratio of ½ (polybutadiene/fatty acid dimer) is made.

Then the resulting mixture is mixed with polyamide as described below.

Production of a PA 11 Diamine Block with Number Average Molecular Weight of 5000 g/mol:

to a 12 L autoclave equipped with an anchor-type stirrer, 5000 g of 11-aminoundecanoic acid, 116.2 g hexamethylenediamine, and 750 g deionized water are added. The medium is inerted with nitrogen then heated to 210° C. in the mass with stirring. The pressure is then 20 bars. Then the medium is heated to 230° C. in the mass, maintaining the pressure at 20 bars. When this temperature is reached, the pressure is brought to atmospheric pressure gradually and a nitrogen purge is applied for 90 minutes.

Therefore the resulting product is emptied in liquid nitrogen and recovered in block form.

The chain ends are assayed by potentiometry:
$NH_2$=0.399 meq/g
The molecular weight is 5000 g/mol.
Fabrication of a Pentablock In a 12 L autoclave equipped with an anchor-type stirrer, 761.9 g of Krasol® LBH-P 2000 (viscosity 13 000 cP, Mn=2100, 438.1 g of Pripol® 1013 (M=575 g/mol), 1.2 g of Irganox® 1098 and 1.2 g of phosphoric acid are added. The medium is stirred and is brought to a temperature of 235° C. under vacuum for 3 hr. The medium is brought to atmospheric pressure. 3800 g of the previously prepared block is added and the reaction occurs under vacuum at 235° C. for 90 min.

The product is them emptied in water and granulated.
The potentiometric assay of chain ends:
$NH_2$=0.18 meq/g
Potentiometric Assay of Amine Chain Ends
500 mg of polymer is dissolved in 80 g of m-cresol at 130° C. for 1 hr.
0.02 N perchloric acid (in acetic acid) is added until the chain ends are neutralized. This neutralization is accompanied by a potential change, monitored using electrodes.

2/Tests and Results

The thermal stability of the synthesized copolymer is evaluated by oscillatory rheology.

The results are in the graph in FIG. 1 attached.

This graph shows how the rheology of the synthesized copolymer changes at 230° C. (upper line) and 250° C. (lower line) for 600 h.

This graph shows that the rheology of the copolymer changes very little. The slope of these lines is very low.

The graph shows that the copolymer has remarkable rheological stability at high temperature.

3/ Evaluation of Adhesion of the Pentablock Copolymer of the Invention (Example 1 Above) on a Metal.

The pentablock of the invention was cryoground on a Retsch ZM 200 mill in two passes:
1-2 mm sieve 18 000 rpm
2-1 mm sieve 18 000 rpm
then applied in a quenching process on burned and shot-peened tubes.

A BMNO (PA 11 produced by Arkema) was ground and applied in the same conditions.

The particle size of the various milled products is as follows: D50~200 μm.

The applications were made with and without postfusion.
Results:

|  | Pentablock of the invention (example 1) | BMNO PA 11 |
|---|---|---|
| Application without postfusion: 10 min 330° C. quench 4 s then cooling in ambient air |  |  |
| Adhesion | 4 | 1 |
| Application with postfusion: 10 min 330° C. quench 4 s then postfusion 5 min 250° C. then cooling in ambient air |  |  |
| Adhesion | 4 | 0.5-1 |

Metal adhesion is tested by manual peeling.
The adhesion results on a scale from 0.5-1 to 4:
0.5-1: Does not adhere
2: Average adhesion
3: Good adhesion
4: Excellent adhesion.

The adhesion of the pentablock according to the invention is much higher than a polyamide alone such as BMNO whether with or without postfusion.

The invention claimed is:

1. A block copolymer including:
   at least one polyamide block,
   at least one polyolefin block,
   at least one alkylene block positioned between one of the at least one polyamide block and one of the at least one polyolefin block, and wherein the alkylene block is the result of polycondensation of fatty acid dimers, and
   wherein the block copolymer has the following formula:

PA-(R-Pol-PA)n-R-Pol-R-PA, where n is between 0 and 100,
   PA denotes the polyamide block,
   R denotes the alkylene block, and
   Pol denotes the polyolefin block.

2. A block copolymer according to claim 1, wherein at least one polyolefin block includes at least one polybutadiene.

3. A block copolymer according to claim 1, wherein
   the at least one polyamide block is present in an amount comprised between 2 and 98% by weight relative to the total weight of the block copolymer,
   the at least one polyolefin block is present in an amount comprised between 2 and 98% by weight relative to the total weight of the block copolymer.

4. A block copolymer according to claim 1, wherein the at least one alkylene block is present in an amount comprised between 0.1 and 25% by weight relative to the total weight of the block copolymer.

5. A block copolymer according to claim 1 further comprising at least one chain lengthener block.

6. A block copolymer according to claim 5, wherein the at least one chain lengthener block is located at least one polyamide end of the block copolymer.

7. A preparation process for the copolymer as defined in claim 1, including a step of mixing the different blocks.

8. A preparation process according to claim 7, including the following successive steps:
   a step of mixing polyolefin and alkylene blocks, the molar ratio between the polyolefin blocks and the alkylene blocks being greater than or equal to ½, then
   a step of mixing polyamide blocks with the mixture obtained in the preceding step.

9. A preparation process according to claim 7, comprising an extra step of mixing chain lengthener blocks with the mixture obtained in the preceding step.

10. A composition comprising at least one block copolymer as defined in claim 1.

11. A composition according to claim 10, wherein the composition is in the form of powder or granules.

12. A process of using the composition defined in claim 10, comprising an injection, extrusion or spraying step.

13. A component comprising
    at least one portion comprising metal and
    a composition as defined in claim 10,
    said composition being applied to said portion.

14. A component according to claim 13, comprising a second portion, and wherein the composition is interposed and is in contact with both portions.

15. A component according to claim 13, wherein the component is present in the form of a cable, a rope, a tube, a container, a film or a plate.

16. A method of transporting or storing fluid in vehicles, underwater (off-shore) or on-shore platforms, and/or cooling systems, using the component as defined in claim 13.

17. A method according to claim 16, wherein the fluid is chosen from an oil, a brake liquid, urea solutions, glycol-based cooling liquids, fuels, biofuels, biodiesels, potable water, waste water, gas, air, heat transfer fluids, oil and its derivatives.

* * * * *